(12) United States Patent
Fleizach et al.

(10) Patent No.: US 9,405,847 B2
(45) Date of Patent: Aug. 2, 2016

(54) CONTEXTUAL GROUPING OF A PAGE

(75) Inventors: Christopher Fleizach, La Jolla, CA (US); Eric Taylor Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1753 days.

(21) Appl. No.: 12/135,003

(22) Filed: Jun. 6, 2008

(65) Prior Publication Data

US 2009/0307266 A1 Dec. 10, 2009

(51) Int. Cl.
*G06F 17/00* (2006.01)
*G06F 17/30* (2006.01)

(52) U.S. Cl.
CPC .... *G06F 17/30899* (2013.01); *G06F 17/30905* (2013.01)

(58) Field of Classification Search
CPC .................................................. G06F 17/30905
USPC .......................................................... 715/243
See application file for complete search history.

(56) References Cited

U.S. PATENT DOCUMENTS

| | | | |
|---|---|---|---|
| 5,390,295 A | 2/1995 | Bates et al. | |
| 5,513,342 A | 4/1996 | Leong et al. | |
| 5,623,681 A | 4/1997 | Rivette et al. | |
| 5,664,076 A | 9/1997 | Pluta et al. | |
| 5,671,378 A | 9/1997 | Acker et al. | |
| 5,721,848 A | 2/1998 | Joseph | |
| 5,790,435 A | 8/1998 | Lewis et al. | |
| 5,886,694 A | 3/1999 | Breinberg et al. | |
| 5,895,476 A * | 4/1999 | Orr et al. | 715/202 |
| 5,953,733 A | 9/1999 | Langford-Wilson | |
| 6,101,513 A | 8/2000 | Shakib et al. | |
| 6,335,743 B1 | 1/2002 | Owings | |
| 6,603,493 B1 | 8/2003 | Lovell et al. | |

(Continued)

FOREIGN PATENT DOCUMENTS

| | | |
|---|---|---|
| EP | 0 955 580 | 11/1999 |
| EP | 0 996 053 | 4/2000 |

(Continued)

OTHER PUBLICATIONS

Yu et al., "A novel multimodal interface for improving visually impaired people's web accessibility" Virtual Reality (2006) 9: p. 133-148.*

(Continued)

*Primary Examiner* — Amelia Tapp
(74) *Attorney, Agent, or Firm* — Blakely, Sokoloff, Taylor & Zafman LLP

(57) ABSTRACT

A method includes generating, for a page comprising a plurality of elements, a contextual grouping of at least one of the plurality of elements based on an object model of the page. A method includes generating a user interface for a non-sighted user based on a page, the user interface comprising at least one contextual grouping generated based on an object model of the page. A method includes identifying a page to be analyzed, the page based on a document object model (DOM) and having a plurality of elements configured to be visually arranged when the page is generated for display. The method includes processing the identified page based on the DOM to include each of the plurality of elements in at least one contextual group associated with the page. The method includes facilitating navigation of the page by a non-sighted user using the at least one contextual group.

28 Claims, 4 Drawing Sheets

(56) References Cited

U.S. PATENT DOCUMENTS

| | | | |
|---|---|---|---|
| 6,697,781 B1 | 2/2004 | Sahlberg | |
| 6,802,058 B2 | 10/2004 | Banavar et al. | |
| 7,313,757 B2 | 12/2007 | Bradley et al. | |
| 7,480,858 B2* | 1/2009 | Chen et al. | 715/234 |
| 7,496,831 B2* | 2/2009 | Dutta et al. | 715/207 |
| 7,530,020 B2* | 5/2009 | Szabo | G06F 17/30067 707/999.003 |
| 7,870,503 B1* | 1/2011 | Levy et al. | 715/783 |
| 8,370,757 B2* | 2/2013 | Tinari | G06F 17/2229 345/619 |
| 8,744,852 B1 | 6/2014 | Seymour et al. | 704/260 |
| 2001/0054049 A1* | 12/2001 | Maeda et al. | 707/517 |
| 2002/0113110 A1 | 8/2002 | Wohlwend et al. | |
| 2002/0120645 A1* | 8/2002 | Adapathya et al. | 707/501.1 |
| 2002/0194219 A1 | 12/2002 | Bradley et al. | |
| 2003/0222922 A1 | 12/2003 | Rummel | |
| 2004/0100510 A1* | 5/2004 | Milic-Frayling | G06F 17/30905 715/864 |
| 2004/0145607 A1 | 7/2004 | Alderson | |
| 2005/0028084 A1 | 2/2005 | Dziejma | |
| 2006/0253831 A1 | 11/2006 | Harper et al. | |
| 2007/0198945 A1 | 8/2007 | Sun et al. | |
| 2008/0235585 A1* | 9/2008 | Hart et al. | 715/717 |

FOREIGN PATENT DOCUMENTS

| | | |
|---|---|---|
| WO | WO 01/79986 | 10/2001 |
| WO | WO 02/01388 | 1/2002 |

OTHER PUBLICATIONS

Mahmud, et al. ("Mahmud"), "CSurf: A Context-Driven Non-Visual Web-Browser", WWW 2007, May 8-12, 2007 ACM, p. 31-40.*

Juvina et al., "Toward Modeling Contextual Information in Web Navigation", (2005). Toward Modeling Contextual Information in Web Navigation, CogSci, p. 1078-83.*

Yesilada, et al., "Screen Readers Cannot See: Ontology Based Semantic Annotation for Visually Impaired Web Travellers", 2004, p. 1-14.*

Zajicek, et al., "Building a Conceptual Model of the World Wide Web for Visually Impaired Users", Jan. 17, 2007, p. 1-7.*

International Preliminary Report on Patentability for Application No. PCT/US2009/044011, dated Dec. 16, 2010, 8 pages.

International Search Report and Written Opinion, International Application No. PCT/US2009/044011, mailed Aug. 11, 2009, 14 pages.

Vanderdonckt and Gillo, "Visual Techniques for Traditional Multimedia Layouts," *Proc. 2nd Workshopon Advnaced Visual Interfaces*, ATV94, Jun. 1994, ACM Press, 10 pages.

http://www.freesoft.org/CIE/RFC/1942/17.htm—"An Internet Encyclopedia," printed from the Internet Aug. 18, 2003, 3 pages.

El-Said et al. "ADDI: A Tool for Automating the Design of Visual Interfaces," *Computer & Graphics*, 1997, vol. 21, No. 1, pp. 79-87.

"SpecTel 1.1 User's Guide" *Sun Microsystems, Inc.*, Obtained Online, Sep. 25, 1997, pp. 91-122.

'Document Object Model' [online]. Wikipedia, [retrieved on Jul. 6, 2009] [published on Dec. 2, 2007], 5 pages (pp. 1-5). Retrieved from the Internet: http://web.archive.org/web/20071202041931/http://en.wikipedia.org/wiki/Document_Objec.

Vanderdonckt and Puerta (eds), *Computer-Aided Design of User Interfaces II*, 1999, Kluwer Academic Publishers, Dordrecht, pp. 33-42, 305-312, 337-355 (356 pages).

Lidie et al. "Mastering Perl/TK" O'Reilly & Associates, Jan. 2002, Chapters 1, 2, and 11, pp. 1-70 and 231-239 (90 pages).

* cited by examiner

FIG. 3

CONTEXTUAL GROUPING OF A PAGE

BACKGROUND

Most computer systems and other devices have some form of user interface. In personal computers, for example, a screen is often presented on a connected display device. This screen can include information and/or other content provided from an application program and/or an operating system, to name just a few examples. Different types of display devices exist.

A user who sees the content of a displayed page may be able to identify and focus on a relevant portion relatively quickly. This is because the user may be able to visually scan the screen with his or her eyes and zero in on the content that is of interest. A non-sighted reader, however, such as a person with limited vision, may not be able to visually scan the page in the same way or as efficiently.

SUMMARY

The invention relates to processing content such as a page.

In a first aspect, a method includes generating, for a page comprising a plurality of elements, a contextual grouping of at least one of the plurality of elements based on an object model of the page.

Implementations can include any, all or none of the following features. The method can further include recording the generated contextual grouping such that it is associated with the page. The method can further include using the recorded contextual grouping to provide navigation of the page to aid a non-sighted user. The object model can be a document object model. Generating the contextual grouping can include processing the page in a first pass based on the object model to determine a plurality of groups comprising the plurality of elements; and processing the determined plurality of groups in a second pass to determine whether to combine any of the determined groups into the contextual grouping. Processing the page in the first pass can include creating a running directional sense as each element is processed, the directional sense representing a difference in horizontal and vertical position of a previously processed element relative to a currently processed object. The processing in the first pass can be performed using at least a first rule and the processing in the second pass can be performed using at least a second rule. The first rule can use a length of a string included in the element being processed. The first rule can use a width or height of the element being processed. The first rule can use whether the element being processed is a link or header object in the object model. The first rule can use whether the element being processed visually touches another of the plurality of elements. The first rule can use how many of the plurality of elements are in one of the plurality of groups that has been determined. The first rule can use a directional sense of the element being processed another of the plurality of elements. The second rule can use a distance in at least one of horizontal and vertical direction from the element being processed to another of the plurality of elements. The second rule can use a size of at least one of the plurality of groups from the first pass. The second rule can use an intersection between one of the plurality of groups currently processed with another of the plurality of groups.

In a second aspect, a method includes generating a user interface for a non-sighted user based on a page, the user interface comprising at least one contextual grouping generated based on an object model of the page.

Implementations can include any, all or none of the following features. Generating the user interface can provide that the non-sighted user can skip at least one entire region of the page without visiting each of the elements in the region.

In a third aspect, a method includes identifying a page to be analyzed, the page based on a document object model (DOM) and having a plurality of elements configured to be visually arranged when the page is generated for display. The method includes processing the identified page based on the DOM to include each of the plurality of elements in at least one contextual group associated with the page. The method includes facilitating navigation of the page by a non-sighted user using the at least one contextual group.

Implementations can include any, all or none of the following features. Including each of the plurality of elements in the at least one contextual group can include processing the page in a first pass based on the object model to determine a plurality of groups comprising the plurality of elements, the processing in the first pass is performed using at least a first rule; and processing the determined plurality of groups in a second pass to determine whether to combine any of the determined groups into the contextual grouping, the processing in the second pass is performed using at least a second rule.

DESCRIPTION OF DRAWINGS

FIG. 3 shows an example of contextual groupings on a page.

DETAILED DESCRIPTION

Figure 1:
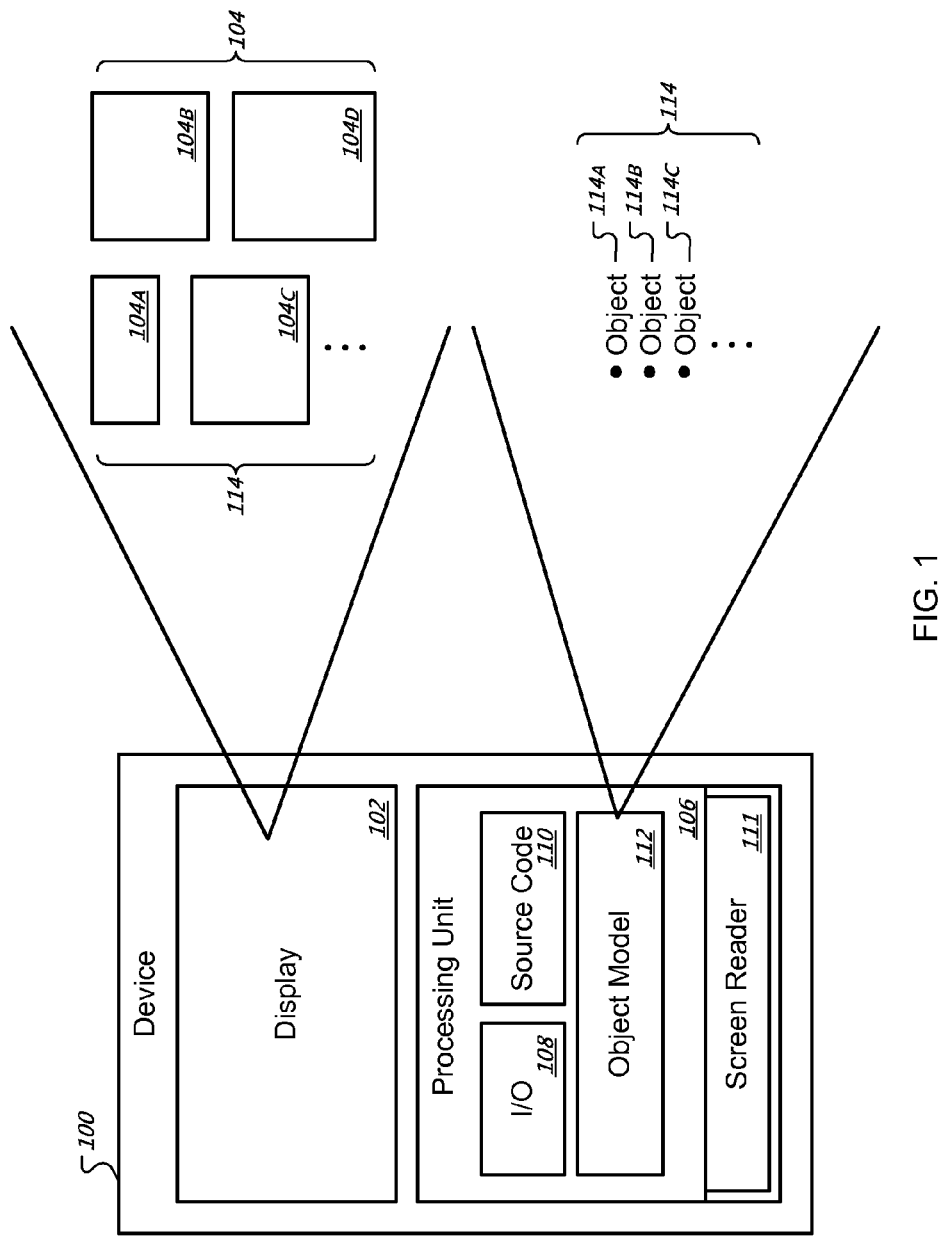
FIG. 1 shows an example of processing a page to generate a contextual grouping.

FIG. 1 shows an example of processing a page to generate a contextual grouping. Here, a device 100 is provided that is intended for users to work with in performing one or more tasks. For example, the device 100 can be a personal computer, a laptop, a workstation, a handheld device, a cellular telephone, a media player, or any other kind of computer-based device. Tasks that can be performed can vary according to the type of the device, and can include browsing a page, entering or retrieving information, working with an application program, accessing a media library, and/or communicating with others, to name just a few examples.

The device 100 has a display 102. In this implementation, the display 102 is configured to output one or more information portions available in the device. For example, the display 102 can output information sought by the user and/or guide the user in making inputs into the device 100. Here, the display 102 includes a plurality of elements 104. As schematically, the elements 104 can have a particular order (e.g., a configuration or layout) when they appear on the display 102. The elements 104 can include any kind of content that appears on the display 102 including, but not limited to, blocks, input controls, text, borders, graphical elements, ornamentations, images, and/or any other display element, to name a few examples.

The device 100 here includes a processing unit 106 that is responsible for processing information for input and/or output in the device 100. In some implementations, the processing unit 106 can comprise at least a processor connected to a memory or other storage unit. That is, the processor can manipulate or otherwise act on information that can be provided to it using the memory. The processing unit 106 can control the appearance of the display 102 using an input/output unit 108 that for example manages the display 102. In some implementations, the input/output 108 can act in coordination with, or be provided as part of, one or more application programs or an operating system in the device 100.

The output on the display 102 can be of many different types. In some implementations, one or more pages can be generated, such as in combination with navigation tools (e.g., hyperlinks and/or page buttons) for the user to switch from one page to another. Any type of display output, including a page, can be generated from code, such as markup code. For example, the device 100 here includes source code 110 that is configured so that the output on the display 102 contains the elements 104. The source code 110 can include any of many different types of code in any language including, but not limited to, HTML code.

The complexity and/or volume of the content on the display 102 (e.g., of the elements 104) can vary. For example, some application programs can produce pages that are relatively simple (e.g., that have relatively few of the elements 104 and/or where the elements 104 are organized in a non-complex pattern). Other programs, in contrast, can produce pages that are relatively complex (e.g., that have relatively many of the elements 104 and/or where the elements 104 are organized in a complex pattern). As yet another example, some application programs can produce output (e.g., on the display 102) that is sometimes complex and other times simple.

Non-sighted users can have tools that allow them to peruse some or all content of a visual output such as the screen 102. One example of such a tool is a so-called screen reader 111 with which the user can select one or more features on the screen (e.g., one of the elements 104), and the tool then causes the device 100 to generate a spoken voice that conveys a message relating to the selected feature. For example, a text-to-speech converter can take text from the selected element as input, process the input to convert the text to speech data, and then use a voice synthesizer to modulate the speech data into audible speech through a speaker.

However, it may be difficult for a non-sighted user to effectively find a portion of the page that is of interest. For example, if the non-sighted user has never before worked with the particular page, the user may not know anything about what the page contains. If the page does not contain a summary that the user can find immediately (e.g., at the beginning of the page), the user's only recourse to learn what the page is about may be to sequentially "step" through many or all of the elements on the page while listening to the screen reader. Thus, when the page and/or its content is complex or otherwise extensive, it may be difficult for a non-sighted user to determine what the page is about. Moreover, stepping through each element sequentially does not allow the user to identify portions of interest based on the layout of the page. For these and/or other reasons, processing can be performed relative to the page in an effort to provide a more efficient user interface. In some implementations, such processing leads to one or more contextual groups being identified on the page. For example, the contextual group can contain the element(s) relating to a particular context and thereby aid the user in navigating on the page. Some of the mentioned processing can involve objects and/or an object model of the page, for example as will now be described.

The page (or other displayed output) can include and/or be based on, one or more objects. For example, each of the elements 104 can correspond to one or more objects recognized by the device 100. Here, an object model 112 is created to define the relevant objects and/or associate them with each other for output on the display 102. The object model 112 here is associated with objects 114, as schematically illustrated. In examples herein, it will be described that the object model can be used to organize page content (e.g., the elements 104) into contextual groupings. In some implementations, the object model 112 and the source code 110 can be associated with each other; share common aspects; or overlap in whole or in part, to name a few examples.

In some implementations, the object model 112 is a document object model (DOM). The DOM can among other things define an order of the objects/elements included in the page. Using the DOM order of a webpage, for example, it can be possible to gather useful information about how the page is intended to be understood visually. For example, the web developer's layout and use of HTML code places objects that are contextually part of the same group in order. When all the objects are retrieved in a list, the similar objects are next to each other in the list. An algorithm can then be performed to recognize whether one object in the list is not part of the same contextual group as the previous object in the list. In some implementations, this can be done by examining only the role of the DOM object and its frame (e.g., the origin and size of the object). That is, a contextual grouping of at least one of the plurality of elements can be generated for the page based on an object model of the page. The generated contextual grouping can be used to provide navigation of the page to aid a non-sighted user.

In some implementations, contextual groups can be determined using a process of two or more passes. A first pass can determine groups among elements based on the DOM order of a webpage. A second pass can then combine one or more groups determined in the first pass into larger groups as applicable. An example of two-pass processing will be described below.

Figure 2:
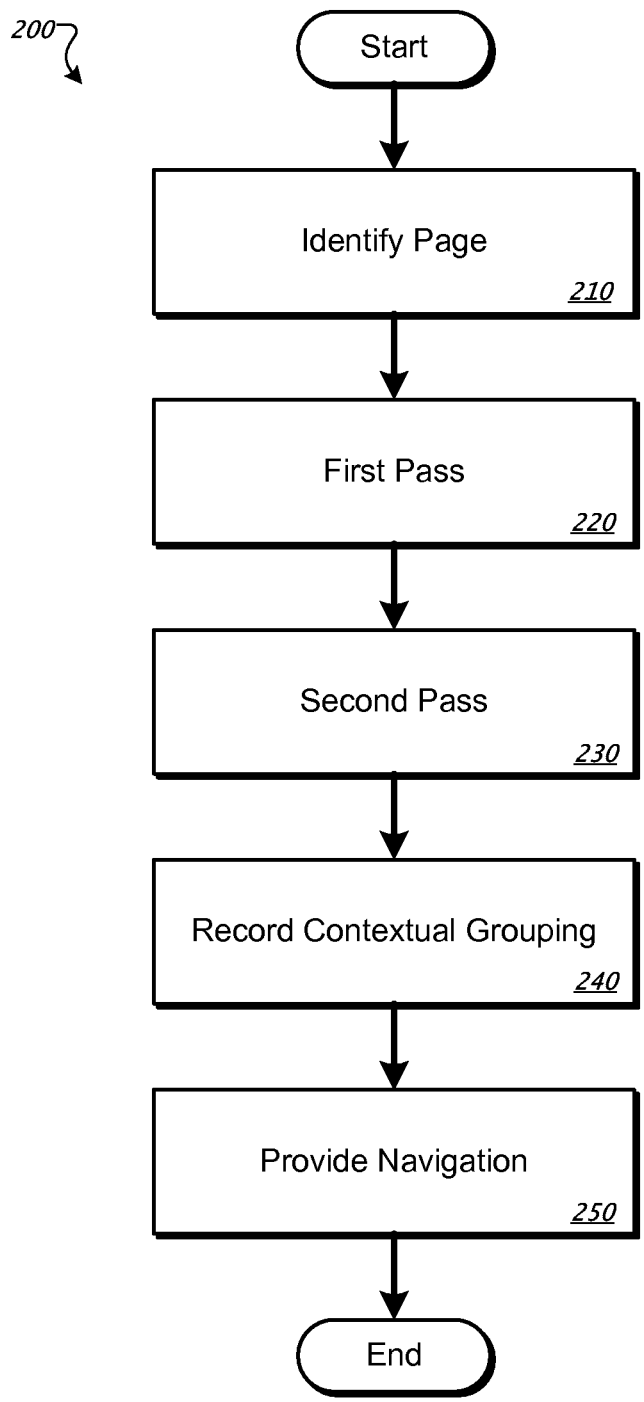
FIG. 2 shows an example of operations that can be performed.

FIG. 2 shows an example of operations that can be performed. Here a method 200 includes steps that can be performed by a processor executing instructions stored in a computer-readable medium, for example in the device 100.

Step 210 involves identifying a page or other content. For example, the device 100 can identify the page containing the elements 104 as one to be processed to aid navigation by a non-sighted user. In some implementations, the identified page is associated with an object model, such as the object model 112, which can be a DOM.

Step 220 involves processing the page in a first pass based on the object model. For example, the first pass can determine a plurality of groups comprising the plurality of elements 104. For example, it can be determined that elements 104A and 104B should belong to a first group, and that elements 104C and 104D should belong to a second group. As noted earlier, this grouping can be determined based on the object model 112, and can therefore to some extent reflect the page designer's intent behind creating the page. The processing in the first pass can be performed using at least a first rule, for example as will be described in examples below.

In some implementations, processing the page in the first pass can include creating a running directional sense as each element is processed. For example, as the elements 104 are processed, the directional sense from the element 104D relative to any or all of the elements 104A-C can be determined. In some implementations, the directional sense can represent a difference in horizontal and vertical position of a previously processed element relative to a currently processed object. For example, the directional sense can be a measure of the horizontal and vertical distances, and therefore the relative direction, between the element 104D and the element 104A.

In the first pass, heuristics and/or other techniques can be used to create groups. In the following examples, the expression "current element" is sometimes used. This can refer to the element that is currently being processed, such as the element 104D. That is, a current element can be applicable in the context of processing an ordered list of elements, as the currently iterated element. In contrast, the element that was processed immediately before the current element is sometimes referred to as the "previous element". Moreover, the element that was processed immediately before the previous element is sometimes referred to as the "previous previous element" to distinguish it from the previous element. For example, the processing in the first pass can proceed as described below.

The first pass can include iterating each object (e.g., the objects 114) in the order defined by the DOM. In this implementation, the first pass is performed to create groups of the elements based on the object modeling, and it must therefore be decided which element(s) to include in each group. In so doing, the first-pass processing can be configured to:

1) Ignore the object in determining when a group starts if the object is:

A string of zero length or a string that only contains white spaces

Has a width or height<=1 pixel

Is part of a link or header DOM object

2) Create a running "directional sense" as each DOM object is iterated. For example, the directional sense can be determined by the difference between the last x and y position of the previous object as compared to the current x and y position (origin) of the DOM object. That is, in this example the directional sense involves a one-dimensional slope calculation.

3) Create a running frame, which encompasses the current group's size and origin. In some implementations, the running frame can describe the frame (e.g., size and origin) of the contextual group that is being determined. As each element is iterated in such implementations, one of three decisions must be made i) Does this element constitute a new group?

ii) Is this element ignored? If so, then move to the next element in the list.

iii) Recognize the current element is part of the current contextual group. The current group can have a frame (running frame) that is the union of all the frames of each element in the contextual group.

4) Create new groups based on the following criteria:

Do not create a new group if any of the following are true:

The previous object and the current object touch in the x direction (e.g., they are on the same horizontal plane and they visually "touch" each other)

The current frame of the group contains the new object. That is, the current frame of the contextual group that is being created may encompass the entire frame of an element being processed in the list. For example, the running frame may have values of x=0, y=0, width=100, height=100, which is visually represented as a 100×100 square. The next element in the list may have a frame of x=90, y=90, width=5, height=5. That square box would be completely inside of the larger frame of the contextual group being determined.

There are less than 2 objects in a group.

Do create a new group if the above criteria for non-creation are not true and any of the following are true:

The previous directional sense in the X direction (e.g., the directional sense from the previous previous element to the previous element) has the same direction as the current directional sense and the Y directions are not the same AND there is no overlap in the Y plane (e.g., the Y ranges do not overlap each other)

The previous directional sense in the Y direction (e.g., the directional sense from the previous previous element to the previous element) has the same direction as the current directional sense and the X directions are not the same AND there is no overlap in the X plane (the X ranges do not overlap each other)

Both directional senses are different and there is no overlap in either the X or the Y plane There has been a significant difference in the Y distance (e.g., greater than 15 pixels) from the current frame of the group to the current DOM object (usually indicating there is a meaningful gap between groups)

There has been a significant difference in the Y directional sense (e.g., greater than 500 pixels), indicating there is a large gap between objects Two DOM objects in a row are out of order, meaning they have a positive y directional sense and a negative x directional sense Thus, according to the above processing in some implementations, the first pass can result in one or more groups being formed of the elements based on the object model. In other implementations, more or fewer rules than exemplified above can be used. As another example, the rules can use different values than above, such as different pixel or distance or directional-sense parameters.

The groups formed in the first pass can then be used in the second pass, for example as will now be described.

Step 230 involves processing the determined plurality of groups in a second pass. For example, the second pass can determine whether to combine any of the determined groups into the contextual grouping. In some implementations, the processing in the second pass is performed using at least a second rule, for example as will be described in examples below.

The second pass can include iterating over each group to determine which groups should be combined. Values between a current group and the past group, such as the minimum and maximum width and height of the groups, can be computed.

The second-pass processing can be configured to:

1) Combine groups if any of the following is true

The Y distance between objects is less than 8 pixels and greater than −3 pixels, AND the height of the current group is less than 25 pixels AND (the smaller width of the frames divided by the larger width of the frames is greater than 0.5 (indicating that they are close to the same size) OR the y distance between the two groups is greater than or less than zero)

The width of the intersection of the two groups is greater than 60% of the smaller width, AND the height of the intersection is greater than 40% of the smaller height (indicating there is a good enough overlap to consider it being one group)

2) If two groups are combined, their frames are combined so that the next group in the iteration is compared against the newly formed group Thus, according to the above processing in some implementations, the second pass can result in one or more contextual groups being formed based on the groups determined in the first pass. For example, the second pass can determine that elements 104A-D should all belong to a contextual group 114. Note that in the first pass, the elements 104C and 104D belonged to a separate group. In other words, the second-pass processing can result in the group of the elements 104C and 104D being merged with that of the elements 104A and 104B as relating to a common context. The screen reader 111 can recognize the contextual group 114. This can simplify the navigation through the elements because if the user determines that the contextual group 114 is not relevant, the user can skip directly from there to a next contextual group without explicitly stepping through the elements 104B-D.

In other implementations, more or fewer rules than exemplified above can be used. As another example, the rules can use different values than above, such as different distance or width or intersection width parameters.

These contextual groups can then be recorded in step 240, for example in the device 100 or in another device with which the device 100 can communicate. In some implementations, the generated contextual grouping can be recorded such that it is associated with the page or other content to which it relates.

Step 250 involves providing navigation based on at least one of the determined contextual groups. In some implementations, the navigation can be provided by generating a user interface on the device 100 for a non-sighted user. Such a user interface can include at least one contextual grouping generated based on an object model of the page. In some implementations, the user interface can provide that the non-sighted user can skip at least one entire region of the page without visiting each of the elements in the region.

Figure 3:
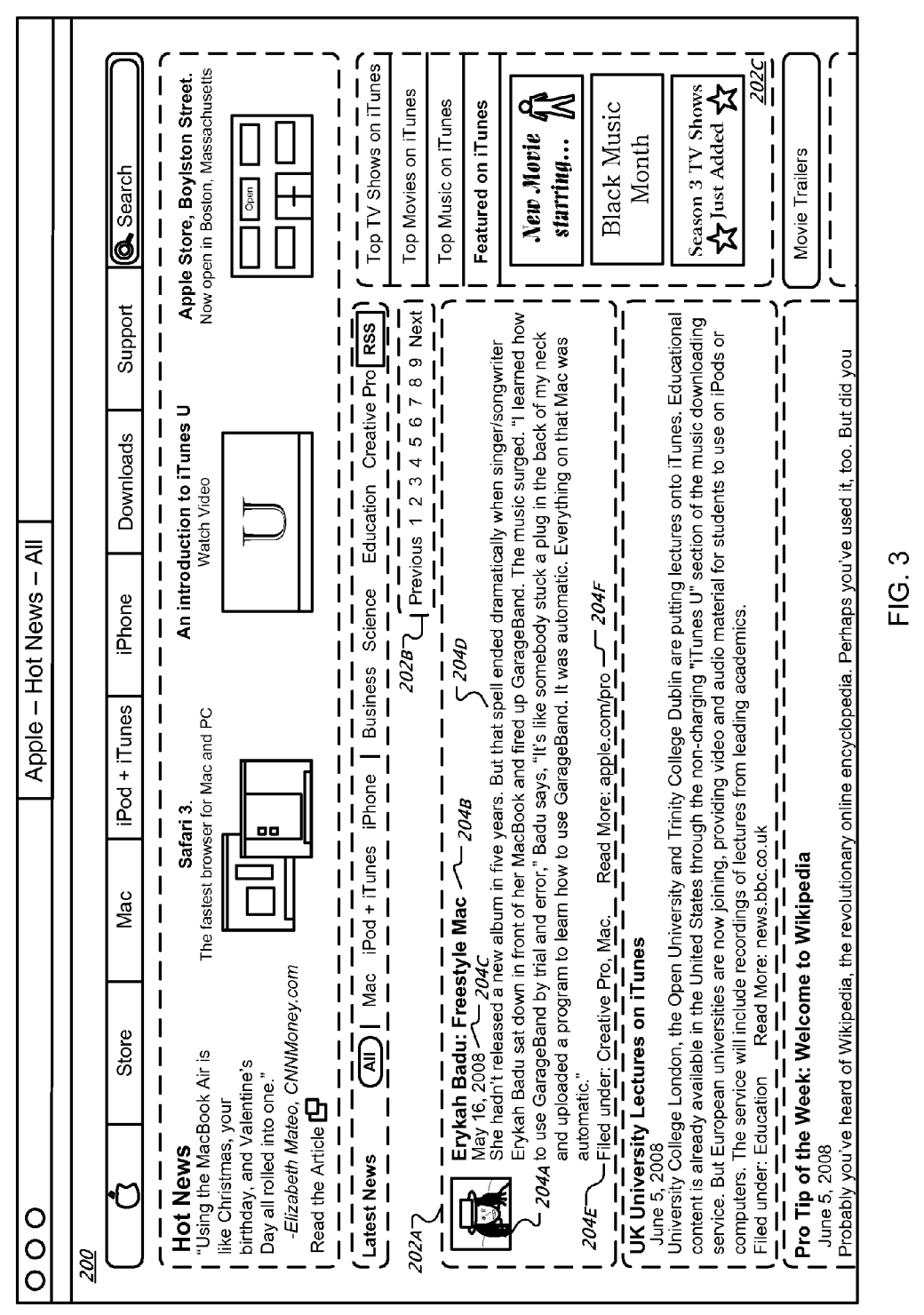

FIG. 3 shows an example of contextual groupings on a page. Here, a page 200 has been processed, for example in accordance with the first and second passes described above. As a result, contextual groupings have been identified for the page 200. Moreover, the contextual groupings can be highlighted on the page 200 for illustration, for example as the page is presented on the device 100.

Here, for example, contextual groups 202 have been outlined in dashed rectangles. Particularly, the first contextual group 202A relates to a particular artist's use of the music composition and notation product GarageBand available from Apple Inc. Accordingly, the context of this grouping can be considered to relate to the artist and/or to the product.

The contextual group 202A is seen to simplify navigation on the page, as it encloses several objects or elements that are related to each other. That is, the group in this example contains an image 204A, a title 204B, a date 204C, a text block 204D, a reference 204E and a link 204F. That is, the user may now be able to navigate past the group 202A rather than step through each of the individual elements.

Other groupings may provide similar benefits. For example, the second contextual group 202B here includes user-selectable page numbers for navigating through a series of pages. Accordingly, the user may avoid the inconvenience of sequentially stepping through each of the page numbers. Similarly, the third contextual group 202C includes auxiliary content placed in the margin of the present page. In some implementations, the content may be advertisements placed on the page 200. Here, for example, the group 202C contains elements relating to TV shows, movies, music and "featured" items.

Other types of content than described in the above examples can be included in contextual groupings. As another example, the contextual grouping in some implementations may be indicated differently or may not be explicitly shown on the page. That is, instead of the dashed rectangles in the above example another indicator, or no visual indicator, can be used.

Figure 4:
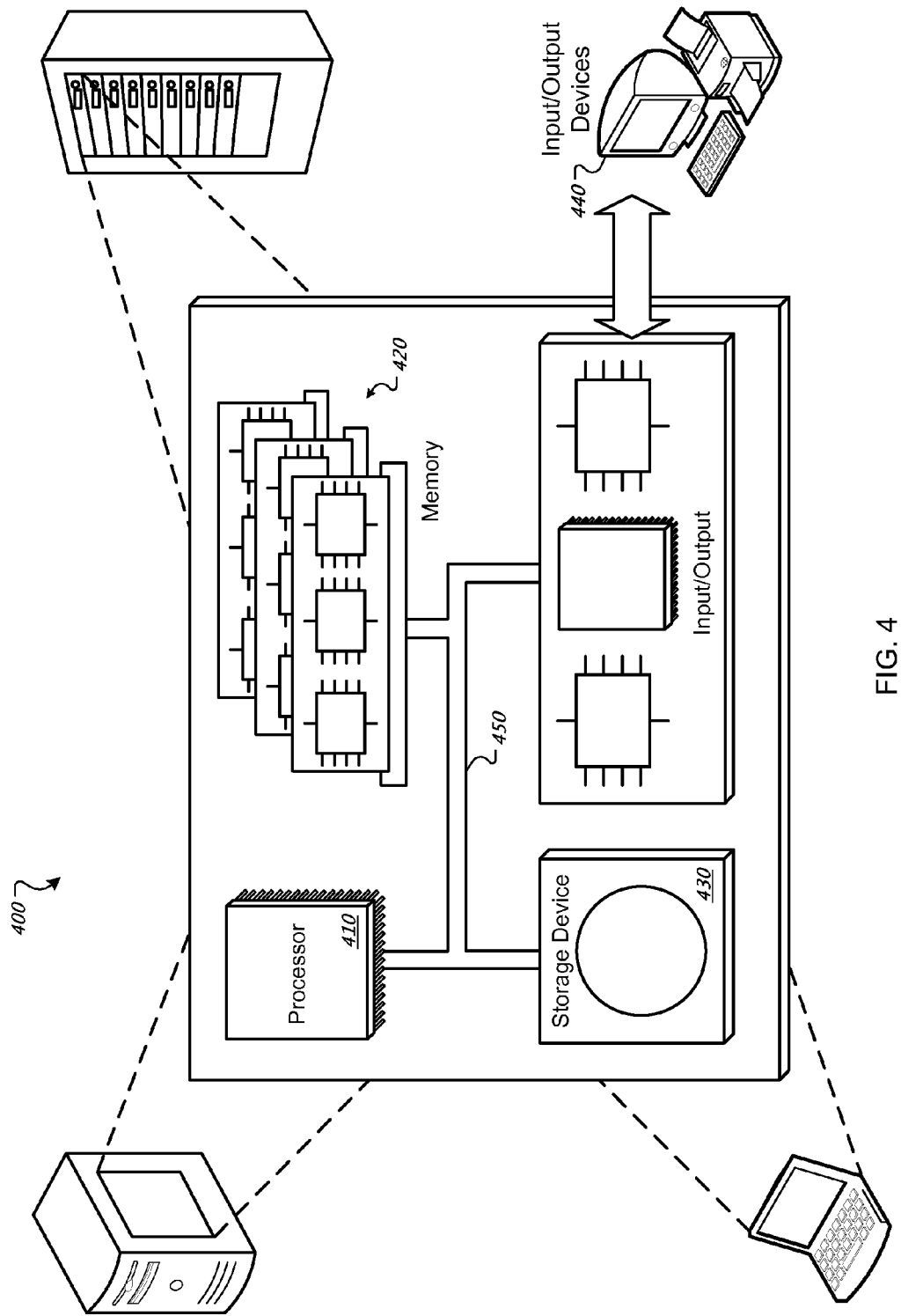
FIG. 4 is a block diagram of an exemplary computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 440, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

The invention claimed is:

1. A computer-implemented method comprising:
receiving a page comprising a plurality of elements that correspond to a plurality of objects arranged according to an object model of the page;
generating, for the page, one or more contextual groupings each including at least one of the plurality of elements based on positions of the plurality of objects in the object model of the page, wherein generating the one or more contextual groupings comprises combining groups having differing topics related to a common context into the one or more contextual groupings;
providing grouping-to-grouping user navigation of the page using the one or more contextual groupings, wherein each of the contextual groupings includes a plurality of elements that are related to the common context, and generating the contextual groupings comprises:
processing the page in a first pass based on the object model, using at least a first rule, to determine a plurality of groups comprising the plurality of elements; and
processing the determined plurality of groups from the page in a second pass, using at least a second rule, to combine two or more groups that are related to the common context into the contextual groupings, the combining including combining groups having differing types of elements that are related to the common context, wherein the second rule is based in part on an amount of overlap between one of the plurality of groups currently processed with another of the plurality of groups.

2. The method of claim 1, further comprising recording the generated contextual groupings such that they are associated with the page.

3. The method of claim 2, wherein the recorded contextual groupings are used to provide navigation of the page to aid a user having reduced or no vision.

4. The method of claim 1, wherein the object model is a document object model.

5. The method of claim 1, wherein processing the page in the first pass comprises creating a running directional sense as each element is processed, the directional sense representing a difference in horizontal and vertical position of a previously processed element relative to a currently processed object.

6. The method of claim 1, wherein the first rule uses a length of a string included in the element being processed.

7. The method of claim 1, wherein the first rule uses a width or height of the element being processed.

8. The method of claim 1, wherein the first rule uses whether the element being processed is a link or header object in the object model.

9. The method of claim 1, wherein the first rule uses whether the element being processed visually touches another of the plurality of elements.

10. The method of claim 1, wherein the first rule uses how many of the plurality of elements are in one of the plurality of groups that has been determined.

11. The method of claim 1, wherein the first rule uses a directional sense of the element being processed relative to another of the plurality of elements.

12. The method of claim 1, wherein the second rule uses a distance in at least one of horizontal and vertical direction from the element being processed to another of the plurality of elements.

13. The method of claim 1, wherein the second rule uses a size of at least one of the plurality of groups, from the first pass.

14. A method comprising:
receiving a page that includes a plurality of elements arranged based on an object model;
processing the page in a first pass based on the object model, using at least a first rule, to create a plurality of groups, each group including one or more elements;
processing the created plurality of groups in a second pass, using at least a second rule, to combine groups having differing topics and elements of differing types that are related to a common context, wherein the second rule is based in part on an amount of overlap between one of the plurality of groups currently processed with another of the plurality of groups;
creating a plurality of contextual groupings comprising the combined groups, wherein each contextual grouping is navigable in a single step;
generating a user interface for a user having reduced or no vision for the page based on the contextual groupings;
displaying the page and the plurality of contextual groupings; and
providing grouping-to-grouping user navigation of the page.

15. The method as in claim 14, wherein a visual appearance of the page after providing grouping-to-grouping user navigation does not differ from a visual appearance of the page before grouping-to-grouping user navigation is provided.

16. A computer-implemented method comprising:
identifying a page to be analyzed, the page including a plurality of elements and being based on a document object model (DOM) that includes a plurality of objects that correspond to the plurality of elements, wherein the plurality of elements are configured to be visually arranged according to the DOM when the page is generated for display on a user interface;
processing the identified page in a first pass based on positions of the plurality of objects included in the DOM to include each of the plurality of elements in one of multiple groups of elements associated with the page wherein processing the identified page in the first pass is performed using at least a first rule;
combining, in a second pass, groups of elements of differing types that are related to a common context to create one or more contextual groupings, wherein the combining groups of elements that are related to the common context is performed using at least a second rule, wherein the second rule is based in part on an amount of overlap between one of the multiple of groups of elements currently processed with another of the multiple of groups of elements; and
facilitating grouping-to-grouping user navigation of the page by a user having reduced or no vision using the one or more contextual groupings.

17. The method of claim 16, wherein a visual appearance of the page after grouping-to-grouping user navigation has been provided does not differ from a visual appearance of the page before grouping-to-grouping user navigation is provided.

18. A non-transitory computer-readable medium storing computer instructions executable by a processor to perform operations comprising:
receiving a page comprising a plurality of elements that correspond to a plurality of objects arranged according to an object model of the page;
generating, for the page, one or more contextual groupings each including at least one of the plurality of elements based on positions of the plurality of objects in the object model of the page, wherein generating the contextual groupings comprises combining groups having differing topics related to a common context into the contextual grouping;
providing grouping-to-grouping user navigation of the page using the one or more contextual groupings, wherein each of the contextual groupings includes a plurality of elements that are related to the common context, and generating the contextual groupings comprises:
processing the page in a first pass based on the object model, using at least a first rule, to determine a plurality of groups comprising the plurality of elements;
processing the determined plurality of groups from the page in a second pass, using at least a second rule, to combine two or more groups that are related to the common context into the contextual groupings the two or more combined groups having differing types of elements that are related to the common context, wherein the second rule is based in part on an amount of overlap between one of the plurality of groups currently processed with another of the plurality of groups.

19. The medium of claim 18, wherein processing the page in the first pass comprises creating a running directional sense as each element is processed, the directional sense representing a difference in horizontal and vertical position of a previously processed element relative to a currently processed object.

20. The medium of claim 18, wherein the first rule uses a length of a string included in the element being processed and a width of height of the element being processed.

21. A system comprising:
one or more processors; and
a non-transitory computer-readable medium storing computer instructions executable by the one or more processors to perform operations comprising:
receiving a page comprising a plurality of elements that correspond to a plurality of objects arranged according to an object model of the page;
generating, for the page, one or more contextual groupings each including at least one of the plurality of elements based on positions of the plurality of objects in the object model of the page, wherein generating the contextual groupings comprises processing the page in a first pass based on the object model, using at least a first rule, to determine a plurality of groups comprising the plurality of elements, processing the plurality of groups in a second pass, using at least a second rule, to determine whether to combine any of the groups into the contextual groupings, wherein the second rule is based in part on an amount of overlap between one of the plurality of groups currently processed with another of the plurality of groups, and processing a plurality of groups to combine two or more groups having differing topics and differing types of elements that are related to a common context; and
providing grouping-to-grouping user navigation of the page using the one or more contextual groupings.

22. The system of claim 21, wherein processing the page in the first pass comprises creating a running directional sense as each element is processed, the directional sense representing a difference in horizontal and vertical position of a previously processed element relative to a currently processed object.

23. The system of claim 21, wherein the first rule uses a length of a string included in the element being processed and a width or height of the element being processed.

24. The system as in claim 21, wherein a visual appearance of the page after grouping-to-grouping user navigation has been provided does not differ from a visual appearance of the page before grouping-to-grouping user navigation is provided.

25. A non-transitory computer-readable medium storing computer instructions executable by a processor to perform operations comprising:
receiving a page that includes a plurality of elements arranged based on an object model;
processing the page in a first pass based on the object model, using at least a first rule, to create a plurality of groups, a group including an element, and at least one group including more than one element; and
processing the plurality of groups in a second pass, using at least a second rule, to create a plurality of contextual groupings by combining groups of elements having differing topics and differing types of elements that are related to a common context based on an overlap between multiple groups in the plurality of groups, wherein each contextual grouping is navigable in a single step;
generating a user interface for a user having reduced or no vision based on the page;
displaying the page and the plurality of contextual groupings; and
providing grouping-to-grouping user navigation of the page.

26. The medium as in claim 25, wherein a visual appearance of the page after providing grouping-to-grouping user navigation does not differ from a visual appearance of the page before grouping-to-grouping user navigation is provided.

27. A system comprising:
a processor; and
a non-transitory computer-readable medium storing a computer instructions executable by the processor to perform operations comprising:
receiving a page that includes a plurality of elements arranged based on an object model;
processing the page in a first pass based on the object model to create a plurality of groups, a group including an element, and at least one group including more than one element; and
processing the plurality of groups in a second pass to create a plurality of contextual groupings by combining groups of elements having differing topics and differing types of elements that are related to a common context based on an overlap between groups, wherein each contextual grouping is navigable in a single step;
generating a user interface for a user having reduced or no vision based on the page;
displaying the page and the plurality of contextual groupings; and
providing grouping-to-grouping user navigation of the page.

28. The system as in claim 27, wherein a visual appearance of the page after grouping-to-grouping user navigation has been provided does not differ from a visual appearance of the page before grouping-to-grouping user navigation is provided.

* * * * *